United States Patent [19]

Ziegler

[11] Patent Number: 4,683,694
[45] Date of Patent: Aug. 4, 1987

[54] HOLDING ARRANGEMENT FOR A PANE SUCH AS A WINDSHIELD

[75] Inventor: Hermann Ziegler, Renningen, Fed. Rep. of Germany

[73] Assignee: Dr. Ing. h.c.F. Porsche Aktiengesellschaft, Fed. Rep. of Germany

[21] Appl. No.: 757,468

[22] Filed: Jul. 22, 1985

[30] Foreign Application Priority Data

Jul. 21, 1984 [DE] Fed. Rep. of Germany ....... 3426995

[51] Int. Cl.$^4$ .............................................. E06B 3/00
[52] U.S. Cl. ....................................... 52/208; 52/400; 296/93
[58] Field of Search ................. 52/208, 397, 716, 764, 52/400; 296/93, 84 A, 84 D, 84 R, 201

[56] References Cited

U.S. PATENT DOCUMENTS

| | | | |
|---|---|---|---|
| 3,672,109 | 6/1972 | Erck | 52/397 X |
| 3,759,004 | 9/1973 | Kent | 52/716 X |
| 3,783,568 | 1/1974 | Adler et al. | 52/400 |
| 4,007,536 | 2/1977 | Soderberg | 52/764 X |
| 4,165,083 | 8/1979 | Dochnahl | 296/93 x |
| 4,179,859 | 12/1979 | Fricko et al. | 52/397 |
| 4,322,105 | 3/1982 | Onda | 296/93 |
| 4,347,693 | 9/1982 | Kruschwitz | 52/716 X |
| 4,438,609 | 3/1984 | Nielson et al. | 52/400 X |
| 4,458,459 | 10/1984 | Irrgang | 52/208 |
| 4,483,113 | 11/1984 | Kruschwitz | 52/716 X |
| 4,530,192 | 7/1985 | Ginster | 52/716 X |
| 4,562,676 | 1/1986 | Kruschwitz | 52/400 X |
| 4,571,278 | 2/1986 | Kunert | 52/400 |

FOREIGN PATENT DOCUMENTS

| | | |
|---|---|---|
| 2520320 | 12/1975 | Fed. Rep. of Germany . |
| 3210106 | 10/1983 | Fed. Rep. of Germany . |
| 2085104 | 12/1971 | France . |
| 2140068 | 11/1984 | United Kingdom . |

*Primary Examiner*—William F. Pate, III
*Assistant Examiner*—Creighton Smith
*Attorney, Agent, or Firm*—Barnes & Thornburg

[57] ABSTRACT

A pane such as a windshield for a motor vehicle is firmly connected by means of an adhesive element to an elastomer profile which is fitted onto a flange of a frame of the pane. The elastomer profile is composed of a U-shaped clamping part having a metallic reinforcing insert and a supporting part for holding the pane at a distance from the frame. Also included is a recess on the top side of the supporting part for receiving a string-shaped adhesive element. This arrangement allows for compensating process tolerances while reducing the amount of required bonding agent. Additionally, this arrangement provides for the pane to be held securely within the frame in the event of an accident.

8 Claims, 3 Drawing Figures

HOLDING ARRANGEMENT FOR A PANE SUCH AS A WINDSHIELD

BACKGROUND AND SUMMARY OF THE INVENTION

This invention relates in general to a holding arrangement for a pane and in particular to a holding arrangement for a pane such as a windshield for a motor vehicle, whereby the windshield is connected to an elastomer profile by an adhesive means, with the profile in turn being fitted onto a flange of the windshield frame.

In German Published Unexamined patent application (DE-OS) No. 32 10 106, an arrangement for holding a pane of this type is described. In this arrangement the elastomer profile has a flat surface on its upper side where the pane is to be adhesively attached by means of a thin layered adhesive element. Because the adhesive element is not able to compensate for manufacturing tolerances in this arrangement, local leakage points between the wave edge of the pane and the frame of the pane may result. Additionally, this arrangement provides that the elastomer profile be connected with the pane before the mounting onto the frame of the pane, thereby requiring the elastomer profile to be relatively soft and flexible in order to permit the subsequent assembling of the combined elastomer profile and pane unit with the frame. As a result, the pane will not be retained in the frame of the pane to an extent required by certain laws, such as the laws of the United States of America, should the pane be subjected to shock caused by an accident.

In another German Published Unexamined patent application (DE-OS) No. 31 31 529, a holding arrangement for a pane is described where the pane is fastened at the flange of the frame by an adhesive element constructed as a polyurethane bonding agent in string-shape form. An elastomer profile is fitted onto the free end of the flange which holds the pane at a distance from the contact surface. This arrangement exhibits the disadvantage in that should removal of the pane be required because scratches are found after final assembly or for repair purposes, such removal would be costly. This is because of the necessity of having to separate the adhesive element from the flange of the frame by chiseling when removing the pane. This is not only time-consuming, but also carries the risk that the flange may be deformed because of the chiseling, thereby resulting in misalignment of the flange and the subsequently reinstalled pane.

Since this arrangement provides that the adhesive element be arranged next to the elastomer profile, the flange of the frame must have a relatively large width, which significantly impairs the flexibility of design in the area. A large amount of bonding agent is also required because of the resulting distance between the pane and the flange, thereby increasing the cost of this assembling.

It is, therefore, an object of this invention to provide an improved holding arrangement for a windshield pane.

It is further an object of the invention to provide an improved holding arrangement which will reduce the amount of bonding agent required for securely holding the pane and thus reduce the cost of the assembly.

It is another object of the invention to provide an improved holding arrangement in which process tolerances are adequately compensated for.

It is also an object of the invention to provide an improved holding arrangement in which the pane is held securely in the frame even if subjected to forces caused by an accident.

The above and other other objects are attained by a holding arrangement whereby the pane is firmly connected to an elastomer profile by an adhesive element. In a preferred embodiment, the profile is fitted onto a flange of a frame of the pane by a U-shaped clamping part having a metallic reinforcing insert. The profile also includes a supporting part for holding the pane at a distance to the frame, and a local recess for receiving a string-shaped adhesive element. The adhesive element provided in this recess is at the top side of the supporting part and extends in the direction of the pane.

The recess is formed by a trough-shaped groove limited by two lips, one facing the edge of the pane, the other facing away from the edge. The lip facing the edge is led to a bordering of the pane's edge whereas the lip facing away from the edge is of a fold-type which rests against the pane while being prestressed.

The advantages achieved by this invention are that by means of the above arrangement of the elastomer profile and the string-shaped bonding agent, process tolerances can easily be compensated and the pane is held in the frame securely and according to regulations.

Also because of the narrow distance between the groove of the profile's recess and the pane, the required quantity of bonding agent can be reduced significantly. In addition, the application of the bonding agent into the groove makes the assembly easier since the location of the bonding agent is clearly defined.

The two lips of the elastomer profile prevent an undesirable spreading of the adhesive element over the windshield, in which case the fold-type lip facing away from the edge of the pane always, while being prestressed, rests against the interior side of the windshield. By means of an arrangement of a contraction of area and of a hollow space at the supporting part, an easy separation of the elastomer profile is ensured in the case of repairs since the remaining webs have a small wall thickness.

Further objects, features, and advantages of the present invention will become more apparent from the following description when taken with the accompanying drawings which show, for purposes of illustration only, an embodiment constructed in accordance with the present invention.

DETAILED DESCRIPTION OF THE DRAWINGS

Figure 1:
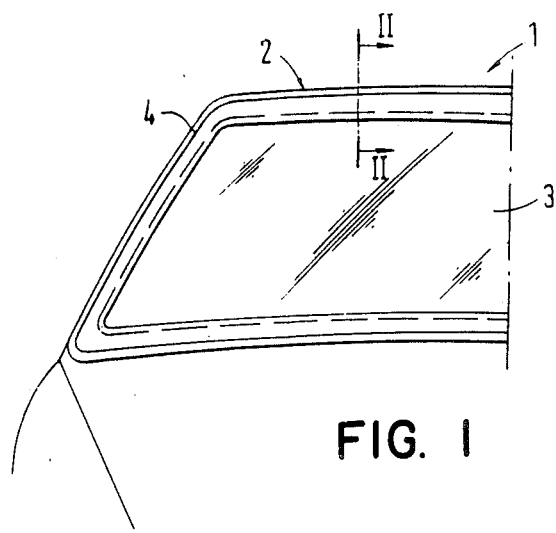
FIG. 1 is a partial frontal schematic view of a motor vehicle having a holding arrangement for a windshield pane in accordance with a preferred embodiment of the invention.

FIG. 1 shows a motor vehicle comprising a body 2 having a windshield 3. For the holding of the windshield 3, a frame 4 is provided that has a flange 5. The flange 5 is formed by body parts 6 and 7 as shown in FIG. 2 and 3.

Figure 2:
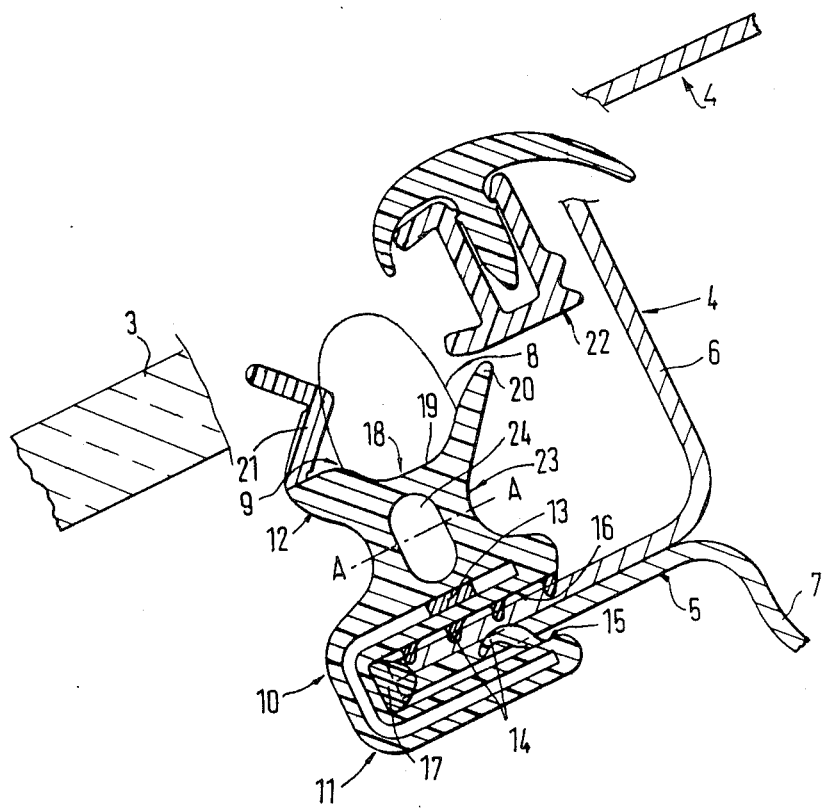
FIG. 2 is an enlarged sectional schematic view taken along line II—II of FIG. 1, showing the components in an unstressed condition prior to engagement with the pane.

FIG. 2 shows the general arrangement of the component parts in their unstressed conditions and provides a frame reference for the discussion below regarding the assembled arrangement of FIG. 3.

Figure 3:
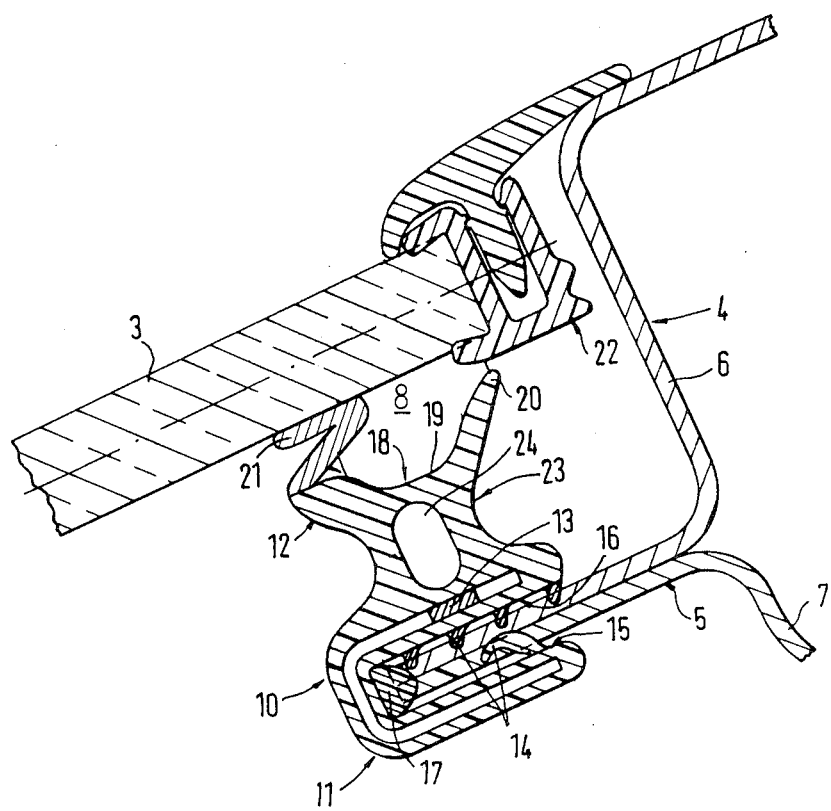
FIG. 3 is an enlarged sectional schematic view taken along line II—II of FIG. 1 which shows the arrangement after assembly.

In FIG. 3, the windshield 3 is held in place by means of an adhesive element 8 arranged between the windshield 3 and the top side 9 of an elastomer profile 10. The elastomer profile 10 is formed by an approximately U-shaped clamping part 11 which fits onto flange 5 and a supporting part 12 located thereabove to hold the windshield 3 at a distance to the frame 4.

The clamping part 11 interacting with the flange 5 has a metallic reinforcing insert 13 and gripping or sealing lips 14 which extend from opposite inside walls 15, 16 of the clamping part 11 toward the inside. The sealing lips 14 rest against opposite sides of the flange 5 while being prestressed. In addition, a permanently elastic sealing element 17 is provided between the clamping part 11 and the flange 5.

The supporting part 12, at its top side 9, locally has a recess 18 for receiving the string-shaped adhesive element 8. The recess 18 is formed by a trough-shaped groove 19 which is limited by two lips 20, 21 extending in the direction of the windshield 3. The recess 18 may also have a cross-section which is boat-shaped, semicircular or of a similar shape according to other contemplated embodiments of the invention.

The outer lip 20 extending in the direction of the frame 4 is led to a bordering 22 of the edge of the windshield, whereas the lip 21 facing away from the edge of the windshield has a fold-type shape and, while being prestressed, supports itself at the windshield 3. The combination of the two lips 20, 21, the shape of the recess 18, and the position of the windshield 3 determine the requirement of bonding agent. The lips 20, 21 also prevent an undesirable spreading of the adhesive element 8 over the windshield 3.

Between the trough-shaped groove 19 and the reinforcing insert 13, the supporting part 12 has a contraction of area 23 and a hollow space 24 so that along the plane A—A, a fast and easy separation of the elastomer profile 10 can take place when a damaged windshield 3 is removed.

The fold-type lip 21 and the gripping or sealing lips 14 are made of a plasticized PVC having a shore-hardness of about 60±3, whereas the remaining part of the elastomer profile is made of rigid PVC having a shore hardness of 80±3.

A single-component polyurethane bonding agent, such as Betaseal, Solbite or a similar agent is used as the adhesive element 8, said bonding agent being able to compensate process tolerances, in particular, in vertical direction with respect to the level B—B of the windshield. The adhesive element 8 is applied in a string-shaped manner directly into the groove 19.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A holding arrangement for supporting a pane, such as a windshield for a motor vehicle, at a flange means of a supporting frame, comprising:
    an adhesive element supportingly engageable with a surface of the pane; and
    an elastomer profile having a first portion of a U-shaped form including a reinforcing insert for fitting onto the flange means and a second portion for holding the pane on one side at a distance from the frame, said second portion including first and second lip means supportingly arranged at said one side of the pane, said second portion have a decreasing cross-section in a direction form the first and second lip means towards the flange means, said first and second lip means delimiting a recess for receiving the adhesive element;
    further comprising a bordering arrange at an edge portion of the pane;
    wherein said first lip means faces said edge of said pane and extends toward said bordering of said edge,
    wherein said second lip means has a fold-type shape for accommodating assembly tolerances, and wherein said second lip means faces away from said edge and rests against said pane while being prestressed.
2. A holding arrangement according to claim 1, wherein the second portion having a decreasing cross-section in the direction from the lip means towards the flange means is provided with a hollow space.
3. A holding arrangement according to claim 2, wherein said recess of said elastomer profile formed by the first and second lip means is trough-shaped.
4. A holding arrangement according to claim 3, wherein said adhesive element is string-shaped.
5. A holding arrangement for supporting a pane, such as a windshield for a motor vehicle, at a flange means of a supporting frame, comprising:
    an adhesive element supportingly engageable with a surface of the pane; and
    an elastomer profile having a first portion of a U-shaped form including a reinforcing insert for fitting onto the flange means and a second portion for holding the pane on one side at a distance from the frame, said second portion including first and second lip means supportingly arranged at said one side of the pane, said second portion have a decreasing cross-section in a direction from the first and second lip means towards the flange means, said first and second lip means delimiting a recess for receiving the adhesive element;
    comprising further a bordering arranged at an edge portion of said pane;
    wherein said first lip means faces said edge of said pane and extends toward said bordering of said pane edge,
    wherein said second lip means has a fold-type shape for accommodating assembly tolerances, and wherein said second lip means faces away from said edge and rests against said pane while being prestressed.
6. A holding arrangement according to claim 5, wherein the second portion having a decreasing cross-section in the direction from the lip means toward the flange means is provided with a hollow space.
7. A holding arrangement according to claim 6, wherein said recess of said elastomer profile formed by the first and second lip means is trough-shaped.
8. A holding arrangement according to claim 7, wherein said adhesive element is string-shaped.

* * * * *